(12) United States Patent
Tang et al.

(10) Patent No.: US 11,701,580 B2
(45) Date of Patent: Jul. 18, 2023

(54) DISPLAY CONTROL METHOD AND RELATED PRODUCTS

(71) Applicant: GUANGDONG OPPO MOBILE TELECOMMUNICATIONS CORP., LTD., Guangdong (CN)

(72) Inventors: Kai Tang, Guangdong (CN); Zhengpeng Tan, Guangdong (CN); Yun Chen, Guangdong (CN); Lizhong Wang, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 297 days.

(21) Appl. No.: 17/226,678

(22) Filed: Apr. 9, 2021

(65) Prior Publication Data
US 2021/0220731 A1 Jul. 22, 2021

Related U.S. Application Data

(63) Continuation of application No. PCT/CN2019/109076, filed on Sep. 29, 2019.

(30) Foreign Application Priority Data

Oct. 11, 2018 (CN) .......................... 201811184534.9

(51) Int. Cl.
*A63F 13/25* (2014.01)
*A63F 13/30* (2014.01)
(Continued)

(52) U.S. Cl.
CPC .............. *A63F 13/25* (2014.09); *A63F 13/30* (2014.09); *G06F 3/14* (2013.01); *H04M 1/0249* (2013.01); *A63F 2300/407* (2013.01)

(58) Field of Classification Search
CPC .... A63F 13/25; A63F 13/30; A63F 2300/407; G06F 3/14; H04M 1/0249
See application file for complete search history.

(56) References Cited

U.S. PATENT DOCUMENTS

| 2015/0143148 A1* | 5/2015 | Park | G06F 1/26 713/321 |
| 2016/0109934 A1* | 4/2016 | Woo | G06F 1/3265 345/211 |

(Continued)

FOREIGN PATENT DOCUMENTS

| CN | 101060593 A | 10/2007 |
| CN | 103684489 A | 3/2014 |

(Continued)

OTHER PUBLICATIONS

Indian Examination Report for IN Application 202117020553 dated Feb. 23, 2022. (7 pages).

(Continued)

*Primary Examiner* — William H McCulloch, Jr.
*Assistant Examiner* — Ankit B Doshi
(74) *Attorney, Agent, or Firm* — Young Basile Hanlon & MacFarlane, P.C.

(57) ABSTRACT

Provided are a display control method and related products. The method includes: obtaining a target operating frequency of a modem in response to detecting that a target game initiates a game booster mode; obtaining a first MIPI operating frequency of a display MIPI bus; obtaining a target game frame rate of the target game in response to detecting the target operating frequency is interfered based on the first MIPI operating frequency; determining a target MIPI operating frequency range list corresponding to the target game frame rate; determining a second MIPI operating frequency having least interference on the target operating frequency of the modem from the plurality of MIPI operating frequen- (Continued)

cies in the target MIPI operating frequency range list; and adjusting a MIPI operating frequency of the display MIPI bus to the second MIPI operating frequency.

18 Claims, 5 Drawing Sheets

(51) Int. Cl.
*G06F 3/14* (2006.01)
*H04M 1/02* (2006.01)

(56) References Cited

U.S. PATENT DOCUMENTS

| | | | |
|---|---|---|---|
| 2017/0118759 A1* | 4/2017 | Choi | H04W 72/0453 |
| 2018/0234191 A1* | 8/2018 | Zhuang | H04W 52/027 |

FOREIGN PATENT DOCUMENTS

| | | | |
|---|---|---|---|
| CN | 104282286 A | 1/2015 | |
| CN | 105827775 A | 8/2016 | |
| CN | 105871477 A | 8/2016 | |
| CN | 105871478 A | 8/2016 | |
| CN | 106160759 A | 11/2016 | |
| CN | 106936515 A | 7/2017 | |
| CN | 107147419 A | 9/2017 | |
| CN | 108063646 A | 5/2018 | |
| CN | 108093135 A | 5/2018 | |
| CN | 108494436 A | 9/2018 | |
| CN | 109348055 A | 2/2019 | |
| JP | 2007158633 A | 6/2007 | |
| KR | 20160043485 A | 4/2016 | |
| KR | 20160115476 A | 10/2016 | |

OTHER PUBLICATIONS

International Search Report and English Translation for International Application No. PCT/CN2019/109076 dated Jan. 3, 2020.
Chinese Office Action and English Translation for Chinese Application No. 201811184534.9 dated Apr. 23, 2020.
Japanese Notice of Reasons for Refusal with English Translation for JP Application 2021519791 dated Jun. 24, 2022. (10 pages).
Korean Office Action with English Translation for KR Application 1020217013705 dated Aug. 17, 2022. (11 pages).
Extended European Search Report for EP Application 19870142.7 dated Oct. 12, 2021. (16 pages).

* cited by examiner

US 11,701,580 B2

DISPLAY CONTROL METHOD AND RELATED PRODUCTS

CROSS-REFERENCE TO RELATED APPLICATION(S)

This application is a continuation application of International Application No. PCT/CN2019/109076, filed on Sep. 29, 2019, which claims priority to Chinese Patent Application No. 201811184534.9, filed on Oct. 11, 2018, the entire contents of both of which are incorporated herein by reference.

TECHNICAL FIELD

The present disclosure relates to a field of electronic technologies, and more particular to, a display control method and related products.

BACKGROUND

In a scenario where a mobile phone is running a game application, requirements on frame rate and definition of a display displaying game pictures are relatively high. When a display Mobile Industry Processor Interface (MIPI) bus for data transmission operates at a fixed frequency, in response to a crossover frequency or a multiple frequency of the display MIPI bus falls on a specific operating frequency of a modem, operations of the modem will be interfered, thereby affecting communication function of an electronic device.

SUMMARY

Embodiments of the present disclosure provide a display control method and related products.

In a first aspect, embodiments of the present disclosure provide a display control method for an electronic device including a display and a modem. The method includes: obtaining a target operating frequency of the modem in response to detecting that a target game initiates a game booster mode; obtaining a first Mobile Industry Processor Interface (MIPI) operating frequency of a display MIPI bus; obtaining a target game frame rate of the target game in response to detecting the target operating frequency is interfered based on the first MIPI operating frequency; determining a target MIPI operating frequency range list corresponding to the target game frame rate, the target MIPI operating frequency range list comprising a plurality of MIPI operating frequencies; determining a second MIPI operating frequency having least interference on the target operating frequency of the modem from the plurality of MIPI operating frequencies in the target MIPI operating frequency range list; and adjusting a MIPI operating frequency of the display MIPI bus to the second MIPI operating frequency.

In a second aspect, embodiments of the present disclosure provide an electronic device. The electronic device includes: a processor, a display and a modem connected to the processor.

The modem is configured to, obtain a target operating frequency of the modem in response to detecting that a target game initiates a game booster mode.

The display is configured to obtain a first MIPI operating frequency of a display MIPI bus.

The processor is configured to obtain a target game frame rate of the target game in response to detecting the target operating frequency is interfered based on the first MIPI operating frequency.

The processor is further configured to determine a target MIPI operating frequency range list corresponding to the target game frame rate, the target MIPI operating frequency range list comprising a plurality of MIPI operating frequencies, and determine a second MIPI operating frequency having least interference on the target operating frequency of the modem from the plurality of MIPI operating frequencies in the target MIPI operating frequency range list.

The display is configured to adjust a MIPI operating frequency of the display MIPI bus to the second MIPI operating frequency.

In a third aspect, embodiments of the present disclosure provide a non-transitory computer-readable storage medium storing a computer program for electronic data exchange, and the computer program is configured to cause a computer to execute a display control method, for an electronic device comprising a display and a modem. The method includes: obtaining a target operating frequency of the modem in response to detecting that a target game initiates a game booster mode; obtaining a first MIPI operating frequency of a display MIPI bus; obtaining a target game frame rate of the target game in response to detecting the target operating frequency is interfered based on the first MIPI operating frequency; determining a target MIPI operating frequency range list corresponding to the target game frame rate, the target MIPI operating frequency range list comprising a plurality of MIPI operating frequencies; determining a second MIPI operating frequency having least interference on the target operating frequency of the modem from the plurality of MIPI operating frequencies in the target MIPI operating frequency range list; and adjusting a MIPI operating frequency of the display MIPI bus to the second MIPI operating frequency.

BRIEF DESCRIPTION OF DRAWINGS

In order to clearly illustrate technical solutions of embodiments of the present disclosure or in the related art, a brief description of drawings used in embodiments or in the related art is given below. Obviously, the drawings in the following descriptions are only part embodiments of the present disclosure, and for those skilled in the art, other drawings can be obtained according to these drawings without creative labor.

DETAILED DESCRIPTION

In order to enable those skilled in the art to better understand the solutions of the present disclosure, the technical solution in the embodiments of the present disclosure will be clearly and completely described below in combination with the drawings in the embodiments of the present disclosure. Obviously, the described embodiments are part of the embodiments of the present disclosure. Based on the embodiments in the present disclosure, all other embodiments obtained by those of ordinary skill in the art without inventive works shall fall within the protection scope of the present disclosure.

The terms "first" and "second" in the specification and claims of the present disclosure and the drawings are used to distinguish different objects, rather than to describe a specific sequence. In addition, the terms "including" and "having" and any variations thereof are intended to cover non-exclusive inclusions. For example, a process, method, system, product, or device that includes a series of steps or units is not limited to the listed steps or units, and may optionally include unlisted steps or units, or optionally includes other steps or units inherent to these processes, methods, products or devices.

The "embodiments" herein means that specific features, structures, or characteristics described in combination with the embodiments may be included in at least one embodiment of the present disclosure. The appearance of this term in various places in the specification does not necessarily refer to the same embodiment, nor is it an independent or alternative embodiment mutually exclusive to other embodiments. Those skilled in the art clearly and implicitly understand that the embodiments described herein can be combined with other embodiments.

Electronic devices involved in the embodiments of the present disclosure may include various handheld devices with wireless communication functions, in-vehicle devices, wireless headsets, computing devices or other processing devices connected to wireless modems, as well as various forms of user equipment (UE), mobile stations (MS), terminal devices and the like. The electronic device may be, for example, a smart phone, a tablet computer or a headset box. For ease of description, the devices mentioned above are collectively referred to as the electronic devices.

Figure 1:
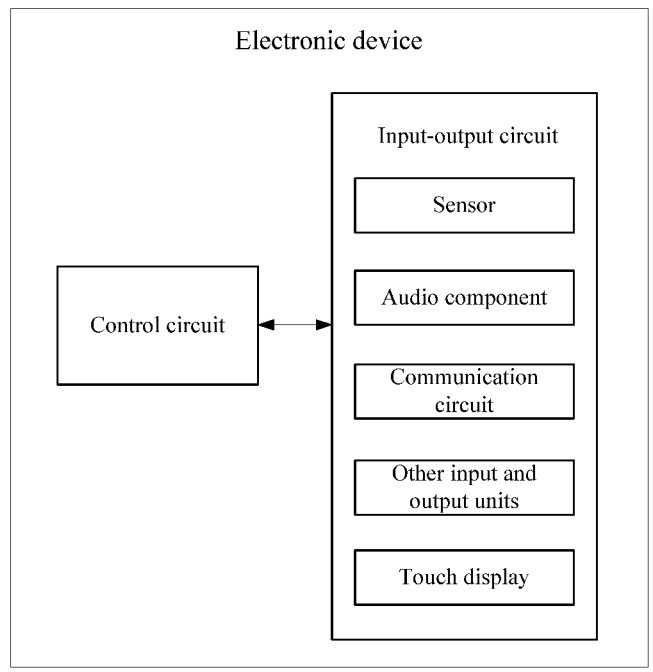
FIG. 1 is a schematic diagram of an electronic device according to an embodiment of the present disclosure.

Refer to FIG. 1, which is a schematic diagram of an electronic device according to an embodiment of the present disclosure. The electronic device includes a control circuit and an input-output circuit, and the input-output circuit is connected to the control circuit.

The control circuit may include a storage and processing circuit. A storage circuit in the storage and processing circuit may be a memory, such as a hard-disk drive memory, a non-volatile memory (such as a flash memory or other electronic programmable read-only memory for forming a solid-state drive), and a volatile memory (such as static or dynamic random access memory), which is not limited in the embodiment of the present disclosure. A processing circuit in the storage and processing circuit may be configured to control operations of the electronic device. The processing circuit is implemented based on one or more microprocessors, microcontrollers, digital signal processors, baseband processors, power management units, audio codec chips, application-specific integrated circuits, and display driver integrated circuits and the like.

The storage and processing circuit may be configured to run software in the electronic device, such as playing incoming call alert ringing applications, playing short message alert ringing applications, playing alarm clock alert ringing applications, playing media file applications, voice over internet protocol (VOIP) phone call applications and operating system functions. Such software may be configured to perform some control operations, such as playing the incoming call alert ringing, playing the short message alert ringing, playing the alarm clock alert ringing, playing the media files, making voice phone calls, and other functions in electronic devices, which are not limited in the embodiment.

The input-output circuit may be configured to enable the electronic device to realize input and output of data, that is, allow the electronic device to receive data from external devices and allow the electronic device to output data to the external devices from the electronic device.

The input-output circuit may further include sensors. The sensors may include ambient light sensors, infrared proximity sensors based on light and capacitance, ultrasonic sensors, touch sensors (for example, light-based touch sensors and/or capacitive touch sensors, and the touch sensor may be a part of a touch screen, or may be independently used as a touch sensor structure), acceleration sensors, gravity sensors and other sensors. The input-output circuit may further include an audio component, and the audio component may be configured to provide audio input and output functions for the electronic device. The audio component may also include a tone generator and other components for generating and detecting voice.

The input-output circuit may also include one or more displays. The display may include one or a combination of a liquid crystal display, an organic light-emitting diode display, an electronic ink display, a plasma display and a display screen using other display technologies. The display may include a touch sensor array (i.e., the display screen may be the touch display). The touch sensor may be a capacitive touch sensor formed by an array of transparent touch sensor electrodes (such as indium tin oxide (ITO) electrodes), or may be a touch sensor formed by other touch technologies, such as acoustic touch, pressure-sensitive touch, resistance touch and optical touch, which is not limited in the embodiments of the present disclosure.

The input-output circuit may further include a communication circuit, which may be configured to provide the electronic device with an ability for communicating with the external devices. The communication circuit may include analog and digital input-output interface circuits, a modem and wireless communication circuits based on radio-frequency signals and/or optical signals. The wireless communication circuit in the communication circuit may include a radio-frequency transceiver circuit, a power amplifier circuit, a low noise amplifier, a switch, a filter, and an antenna. For example, the wireless communication circuit in the communication circuit may include a circuit for supporting near field communication (NFC) by transmitting and receiving near field coupled electromagnetic signals. For example, the communication circuit may include a NFC antenna and a NFC transceiver. The communication circuit may also include a cellular phone transceiver and an antenna, a wireless LAN transceiver circuit and an antenna, etc.

The input-output circuit may further include other input-output units. The input-output units may include buttons, joysticks, click wheels, scroll wheels, touch pads, keypads, keyboards, cameras, light-emitting diodes, and other status indicators, etc.

The electronic device may further include a battery (not illustrated), and the battery is configured to provide electrical energy to the electronic device.

The electronic device described in the above FIG. 1 may be used to implement the following functions.

The modem is configured to, obtain a target operating frequency of the modem in response to detecting that a target game initiates a game booster mode. For example, the modem is configured to, during the electronic device is running a target game, obtain a target operating frequency of the modem, in response to detecting that the target game initiates a game booster mode.

The display is configured to obtain a first MIPI operating frequency of a display MIPI bus.

The storage and processing circuit is configured to obtain a target game frame rate of the target game in response to detecting the target operating frequency is interfered based on the first MIPI operating frequency. For example, the storage and processing circuit is configured to determine whether the target operating frequency is interfered based on the first MIPI operating frequency, and obtain a target game frame rate of the target game in response to the target operating frequency being interfered.

The storage and processing circuit is further configured to determine a target MIPI operating frequency range list corresponding to the target game frame rate, the target MIPI operating frequency range list comprising a plurality of MIPI operating frequencies, and determine a second MIPI operating frequency having least interference on the target operating frequency of the modem from the plurality of MIPI operating frequencies in the target MIPI operating frequency range list.

The display is configured to adjust a MIPI operating frequency of the display MIPI bus to the second MIPI operating frequency.

In a possible example, prior to obtaining the target operating frequency of the modem, the modem is further configured to: in a condition of the display being in a screen-on state, adjust a cycle for detecting the target operating frequency of the modem from a first detecting cycle to a second detecting cycle, in response to detecting, by the modem, that the target game initiates the game booster mode. The first detecting cycle is less than the second detecting cycle.

In a possible example, in respect of determining whether the target operating frequency is interfered based on the first MIPI operating frequency, the storage and processing circuit is configured to: determine a first interference frequency list corresponding to the first MIPI operating frequency based on a preset correspondence relationship between MIPI operating frequencies and interference frequency lists, the first interference frequency list including a plurality of first interference frequencies corresponding to the first MIPI operating frequency; and determine that the target operating frequency is interfered in response to the target operating frequency matching with one of the plurality of first interference frequencies in the first interference frequency list. For example, the storage and processing circuit is configured to match the target operating frequency with the plurality of first interference frequencies in the first interference frequency list in sequence, and determine that the target operating frequency is interfered in response to the matching being successful.

In a possible example, in respect of determining the target MIPI operating frequency range list corresponding to the target game frame rate, the storage and processing circuit is configured to: determine the target MIPI operating frequency range list corresponding to the target game frame rate based on a preset correspondence relationship between MIPI operating frequency range lists and game frame rates.

In a possible example, in respect of determining the second MIPI operating frequency having the least interference on the target operating frequency of the modem from the plurality of MIPI operating frequencies, the storage and processing circuit is configured to: obtain a plurality of reference interference frequency lists by determining a reference interference frequency list corresponding to each of the plurality of MIPI operating frequencies, based on the preset correspondence relationship between MIPI operating frequencies and interference frequency lists; and determine the second MIPI operating frequency corresponding to the second interference frequency list, and the second interference frequency list is a reference interference frequency list in the plurality of reference interference frequency lists and the target operating frequency of the modem is not in the second interference frequency list.

The embodiments of the present disclosure are described in detail.

Figure 2:
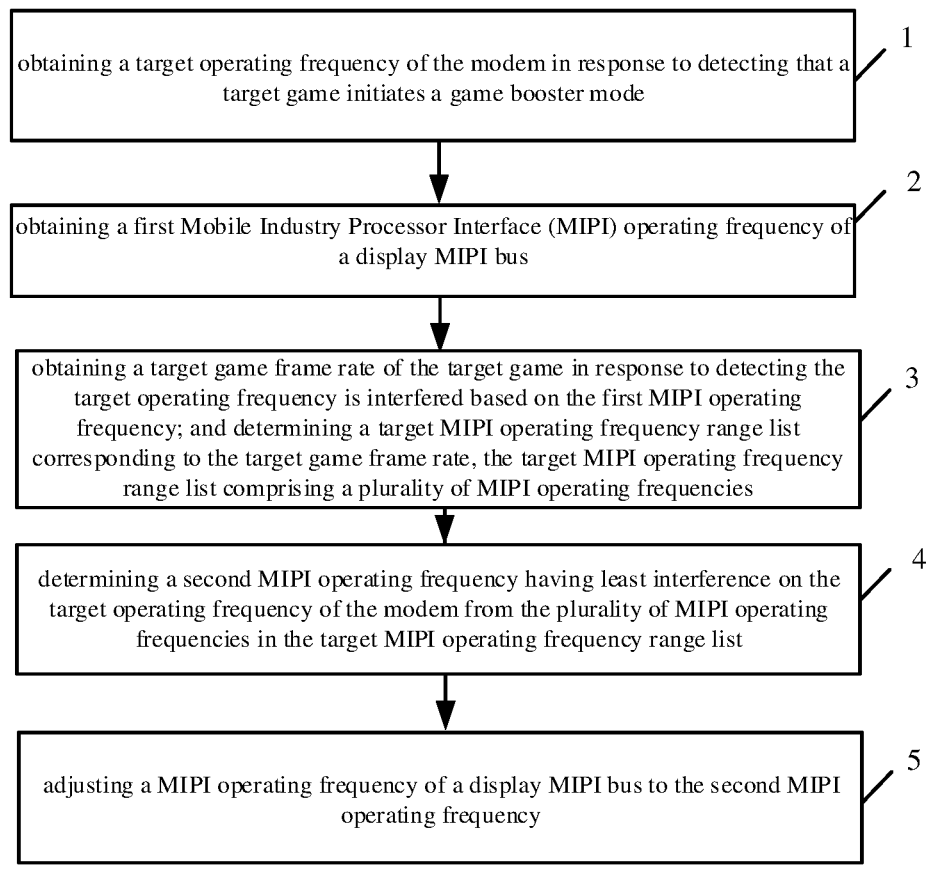
FIG. 2 is a flowchart of a display control method according to an embodiment of the present disclosure.

Refer to FIG. 2, the display control method includes the following blocks.

At block 1, a target operating frequency of the modem is obtained in response to detecting that a target game initiates a game booster mode.

At block 2, a first MIPI operating frequency of a display MIPI bus is obtained.

At block 3, a target game frame rate of the target game is obtained in response to detecting the target operating frequency is interfered based on the first MIPI operating frequency. A target MIPI operating frequency range list corresponding to the target game frame rate is determined. The target MIPI operating frequency range list comprising a plurality of MIPI operating frequencies.

At block 4, a second MIPI operating frequency having least interference on the target operating frequency of the modem is determined from the plurality of MIPI operating frequencies in the target MIPI operating frequency range list.

At block 5, a MIPI operating frequency of the display MIPI bus is adjusted to the second MIPI operating frequency.

Figure 3:
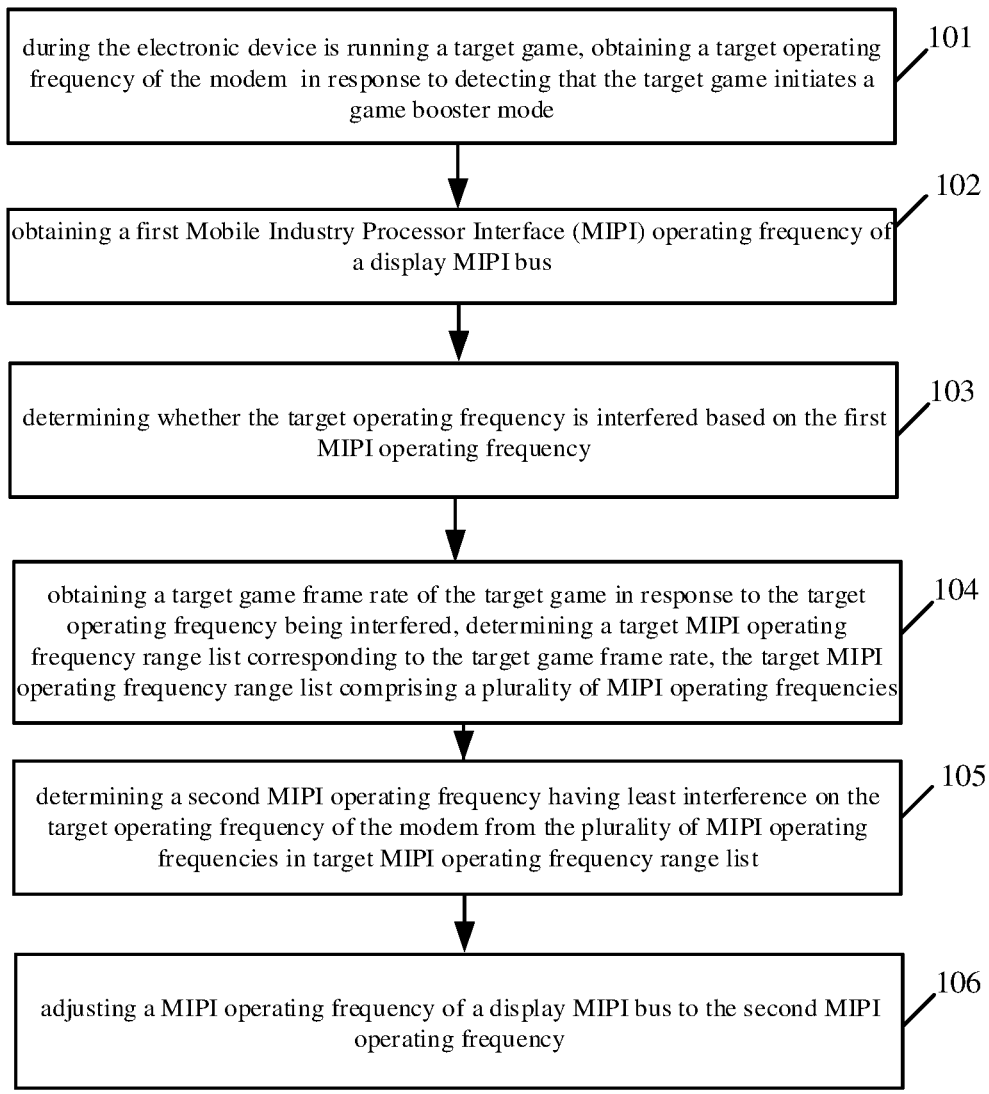
FIG. 3 is a flowchart of a display control method according to an embodiment of the present disclosure.

Refer to FIG. 3, which is a flowchart of a display control method according to an embodiment of the present disclosure. The method is for the electronic device described in the above FIG. 1. The electronic device includes a display and a modem. The display control method includes the following blocks.

At block 101, during the electronic device is running a target game, a target operating frequency of the modem is obtained in response to detecting that the target game initiates a game booster mode.

In the embodiments of the present disclosure, in a scenario where the electronic device runs the target game, requirements for frame rate and definition of displaying game pictures are relatively high, and a real-time requirement for the display transmitting data is high. Therefore, the game is boosted through a dedicated channel. And in a case of boosting the game, a target game business detects the target operating frequency through the modem, and sends the target operating frequency to an application processor (AP) in the electronic device.

Optionally, prior to obtaining the target operating frequency of the modem, the method further includes: in a condition of the display being in a screen-on state, adjusting a cycle for detecting the target operating frequency of the modem from a first detecting cycle to a second detecting cycle in response to detecting, by the modem, that the target game initiates the game booster mode. The first detecting cycle is less than the second detecting cycle.

During the electronic device runs the target game, the modem transmits the data on a relatively fixed dedicated channel, while a possibility of channel change is relatively small. Therefore, in response to detecting that the target game initiates the game booster mode, the cycle for detecting the target operating frequency may be adjusted to the larger second detecting cycle, that is, a frequency for detecting the target operating frequency is reduced, thereby, saving power consumption of the electronic device.

Optionally, in an embodiment, in a condition of the display being in a screen-off state, an operation of sending the target operating frequency to the AP is terminated to avoid power consumption caused by waking up the AP in the screen-off state.

At block 102, a first MIPI operating frequency of a display MIPI bus is obtained.

In the embodiments of the present disclosure, the AP obtains the first MIPI operating frequency of the display MIPI bus according to the cycle for detecting the target operating frequency. After the detecting cycle of the target operating frequency is adjusted from the first detecting cycle to the second detecting cycle, an operating cycle for obtaining the first MIPI operating frequency is adjusted accordingly.

At block 103, whether the target operating frequency is interfered is determined based on the first MIPI operating frequency.

In the embodiments of the present disclosure, the AP may determine whether the target operating frequency is interfered by the first MIPI operating frequency after receiving the target operating frequency of the modem and obtaining the first MIPI operating frequency.

Optionally, at block 103, determining whether the target operating frequency is interfered based on the first MIPI operating frequency includes the following blocks.

At block 31, a first interference frequency list corresponding to the first MIPI operating frequency is determined based on a preset correspondence relationship between MIPI operating frequencies and interference frequency lists, the first interference frequency list includes a plurality of first interference frequencies corresponding to the first MIPI operating frequency.

At block 32, the target operating frequency is matched with the plurality of first interference frequencies in the first interference frequency list in sequence, and it is determined that the target operating frequency is interfered in response to the matching being successful.

The electronic device may obtain a plurality of interference frequency lists of the display MIPI bus at a plurality of MIPI operating frequencies in advance, and each MIPI operating frequency corresponds to one interference frequency list, and then the correspondence relationship between MIPI operating frequencies and interference frequency lists is set. Therefore, after the first MIPI operating frequency is obtained, the first interference frequency list corresponding to the first MIPI operating frequency is determined, and the first interference frequency list includes a plurality of first interference frequencies corresponding to the first MIPI operating frequency, indicating that the first MIPI operating frequency interferes with any one of the plurality of first interference frequencies, where each first interference frequency in the plurality of first interference frequencies refers to the operating frequency at which the modem is interfered in communication The target operating frequency of the modem is matched with the plurality of first interference frequencies in the target interference frequency list in sequence. When there is a first interference frequency equal to the target operating frequency in the plurality of first interference frequencies, the matching is successful, that is, the target operating frequency of the modem falls within the range of the target interference frequency list, it is determined that the target operating frequency is interfered by the first MIPI operating frequency.

At block 104, a target game frame rate of the target game is obtained in response to the target operating frequency being interfered, and a target MIPI operating frequency range list corresponding to the target game frame rate is determined, the target MIPI operating frequency range list includes a plurality of MIPI operating frequencies.

In an embodiment, when it is determined that the target operating frequency of the modem is interfered, the target game frame rate of the target game is obtained, and the target MIPI operating frequency range list corresponding to the target game frame rate is determined, and the display MIPI bus may operate at the MIPI operating frequency within the target MIPI operating frequency range list, thereby ensuring that the target game operates at the target game frame rate.

Optionally, at block 104, determining the target MIPI operating frequency range list corresponding to the target game frame rate includes: determining the target MIPI operating frequency range list corresponding to the target game frame rate based on a preset correspondence relationship between MIPI operating frequency range lists and game frame rates.

The electronic device obtains a plurality of MIPI operating frequency range lists at different game frame rates in advance, and each game frame rate corresponds to one MIPI operating frequency range list, and then the correspondence relationship between the MIPI operating frequency range lists and the game frame rates is set. Therefore, after the target game frame rate of the target game is obtained, the MIPI operating frequency range list corresponding to the target game frame rate is determined. The MIPI operating frequency range list includes a plurality of MIPI operating frequencies corresponding to the target game frame rate. In this way, the display MIPI bus operates at any MIPI operating frequency in the plurality of MIPI operating frequencies, which ensures the target game frame rate of the target game.

At block 105, a second MIPI operating frequency having least interference on the target operating frequency of the modem is determined from the plurality of MIPI operating frequencies in the target game frame rate of the target game.

In an embodiment, after the target MIPI operating frequency range list corresponding to the target game frame rate is determined, since the target MIPI operating frequency range list includes the plurality of MIPI operating frequencies, the second MIPI operating frequency having the least interference on the target operating frequency of the modem is determined from the plurality of MIPI operating frequencies.

Optionally, at block 105, determining the second MIPI operating frequency having the least interference on the target operating frequency of the modem from the plurality of MIPI operating frequencies includes the following blocks.

At block 51, a plurality of reference interference frequency lists are obtained by determining a reference interference frequency list corresponding to each of the plurality of MIPI operating frequencies, based on the preset correspondence relationship between MIPI operating frequencies and interference frequency lists.

At block 52, the second MIPI operating frequency corresponding to the second interference frequency list is determined. The second interference frequency list is a reference interference frequency list in the plurality of reference interference frequency lists and the target operating frequency of the modem is not in the second interference frequency list.

The AP determines the reference interference frequency list corresponding to each MIPI operating frequency in the plurality of MIPI operating frequencies according to the preset correspondence relationship between the MIPI operating frequencies and the interference frequency lists, and obtains the plurality of reference interference frequency lists. For each MIPI operating frequency and the corresponding reference interference frequency list, the target operating frequency matches with a plurality of interference frequencies in the reference interference frequency list in sequence. When there is an interference frequency equal to the target operating frequency in the plurality of interference frequencies in the reference interference frequency list, the matching is successful, and it may be determined that the target operating frequency falls within the range of the reference interference frequency list, thus, the second interference frequency list that is the reference interference frequency list in the plurality of reference interference frequency lists and without the target operating frequency of the modem falling into may be determined, and the second MIPI operating frequency corresponding to the second interference frequency list is the MIPI operating frequency having the least interference on the target operating frequency of the modem.

At block 106, a MIPI operating frequency of the display MIPI bus is adjusted to the second MIPI operating frequency.

In an embodiment, after the second MIPI operating frequency having the least interference on the target operating frequency of the modem is determined, the MIPI operating frequency of the display MIPI bus is adjusted to the second MIPI operating frequency from the first MIPI operating frequency. In this way, the electromagnetic interference of the display MIPI bus to modem communication is eliminated or reduced, and good communication performance may be achieved.

According to the display control method described in the embodiments of the present disclosure, during the electronic device is running the target game, the target operating frequency of the modem is obtained in response to detecting that the target game initiates the game booster mode. The first MIPI operating frequency of the display MIPI bus is obtained. Whether the target operating frequency is interfered is determined based on the first MIPI operating frequency, and the target game frame rate of the target game is obtained in response to the target operating frequency being interfered. The target MIPI operating frequency range list corresponding to the target game frame rate is determined, the target MIPI operating frequency range list includes the plurality of MIPI operating frequencies. The second MIPI operating frequency having the least interference on the target operating frequency of the modem is determined from the plurality of MIPI operating frequencies. The MIPI operating frequency of the display is adjusted to the second MIPI operating frequency. In this way, without changing hardware design of the electronic device, the MIPI operating frequency of the display may be dynamically adjusted in the scenario where the electronic device is running the game application, so that the electromagnetic interference on modem communication is eliminated or reduced and the good communication performance is achieved.

Figure 4:
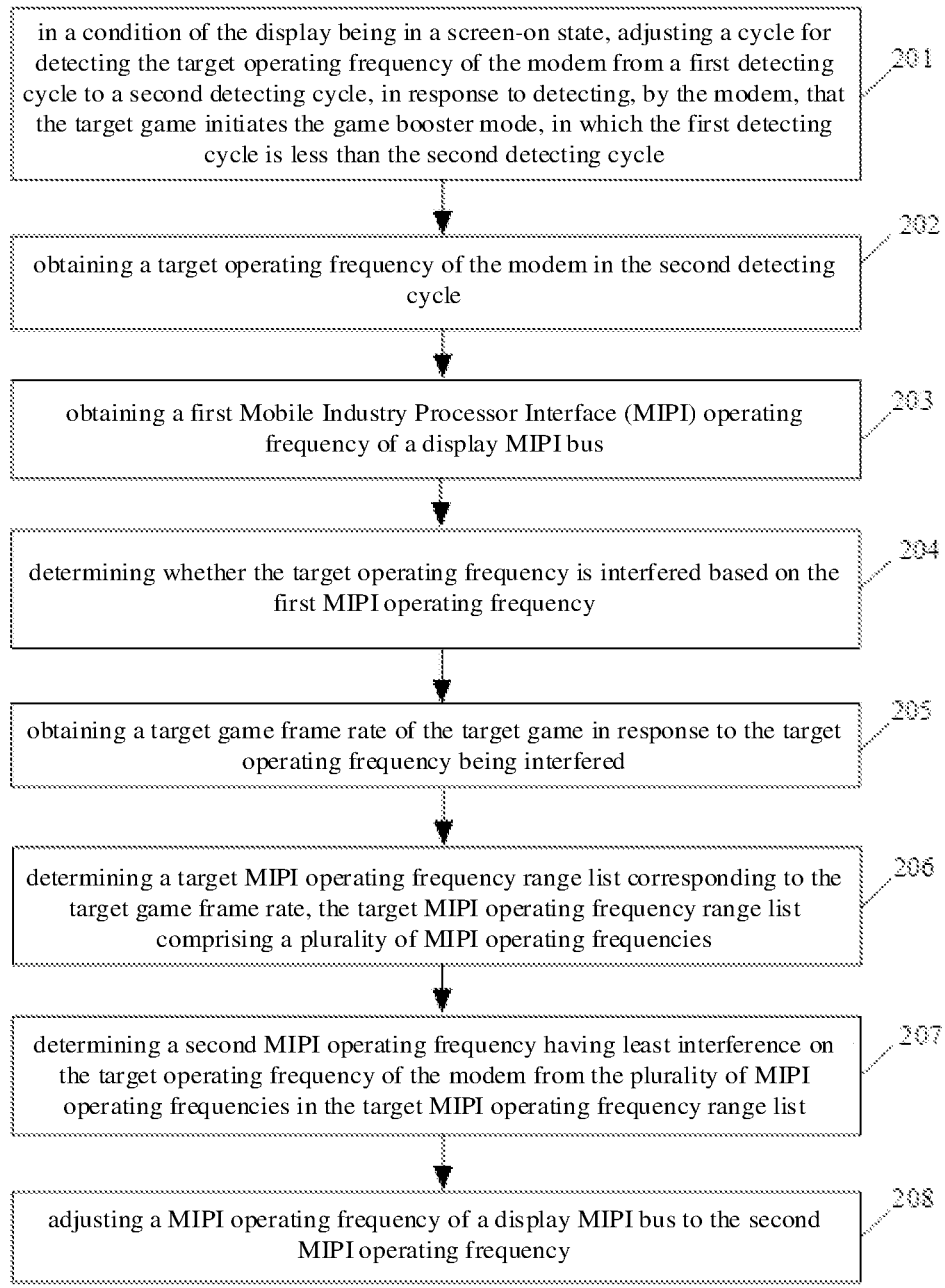
FIG. 4 is a flowchart of another display control method according to an embodiment of the present disclosure.

Consistent with the foregoing, FIG. 4 is a flowchart of another display control method according to an embodiment of the present disclosure. The method is applied to the electronic device as illustrated in FIG. 1, the electronic device includes a display and a modem, and the display control method includes the following blocks.

At block 201, during the electronic device is running a target game, in a condition of the display being in a screen-on state, a cycle for detecting a target operating frequency of the modem is adjusted from a first detecting cycle to a second detecting cycle in response to detecting, by the modem, that the target game initiates a game booster mode. The first detecting cycle is less than the second detecting cycle.

At block 202, the target operating frequency of the modem is obtained with the second detecting cycle.

At block 203, a first MIPI operating frequency of a display MIPI bus is obtained.

At block 204, whether the target operating frequency is interfered is determined based on the first MIPI operating frequency.

At block 205, a target game frame rate of the target game is obtained in response to the target operating frequency being interfered.

At block 206, a target MIPI operating frequency range list corresponding to the target game frame rate is determined, and the target MIPI operating frequency range list includes a plurality of MIPI operating frequencies.

At block 207, a second MIPI operating frequency having the least interference on the target operating frequency of the modem is determined from the plurality of MIPI operating frequencies.

At block 208, a MIPI operating frequency of the display MIPI bus is adjusted to the second MIPI operating frequency.

For the detailed description of blocks 201 to 208, reference may be made to the corresponding description of the display control method described in FIG. 3, which is not repeated here.

According to the display control method, during the electronic device is running the target game and the display is in the screen-on state, the cycle for detecting the target operating frequency of the modem is adjusted from the first detecting cycle to the second detecting cycle in response to detecting, by the modem, that the target game initiates the game booster mode. The target operating frequency of the modem is obtained with the second detecting cycle. The first MIPI operating frequency of the display MIPI bus is obtained. Whether the target operating frequency is interfered is determined based on the first MIPI operating frequency. The target game frame rate of the target game is determined in response to the target operating frequency being interfered. The target MIPI operating frequency range list corresponding to the target game frame rate is determined, and the target MIPI operating frequency range list includes the plurality of MIPI operating frequencies. The second MIPI operating frequency having the least interference on the target operating frequency of the modem is determined from the plurality of MIPI operating frequencies. The MIPI operating frequency of the display MIPI bus is adjusted to the second MIPI operating frequency. In this way, in the scenario where the electronic device is running the target game application, when it is detected that the target game has initiated the game booster mode, the frequency for detecting the target operating frequency of the modem is reduced, thereby, reducing power consumption, and dynamically adjusting the MIPI operating frequency of the display without changing the hardware design of the electronic device, so as to eliminate or reduce electromagnetic interference on modem communication and achieve good communication performance.

Figure 5:
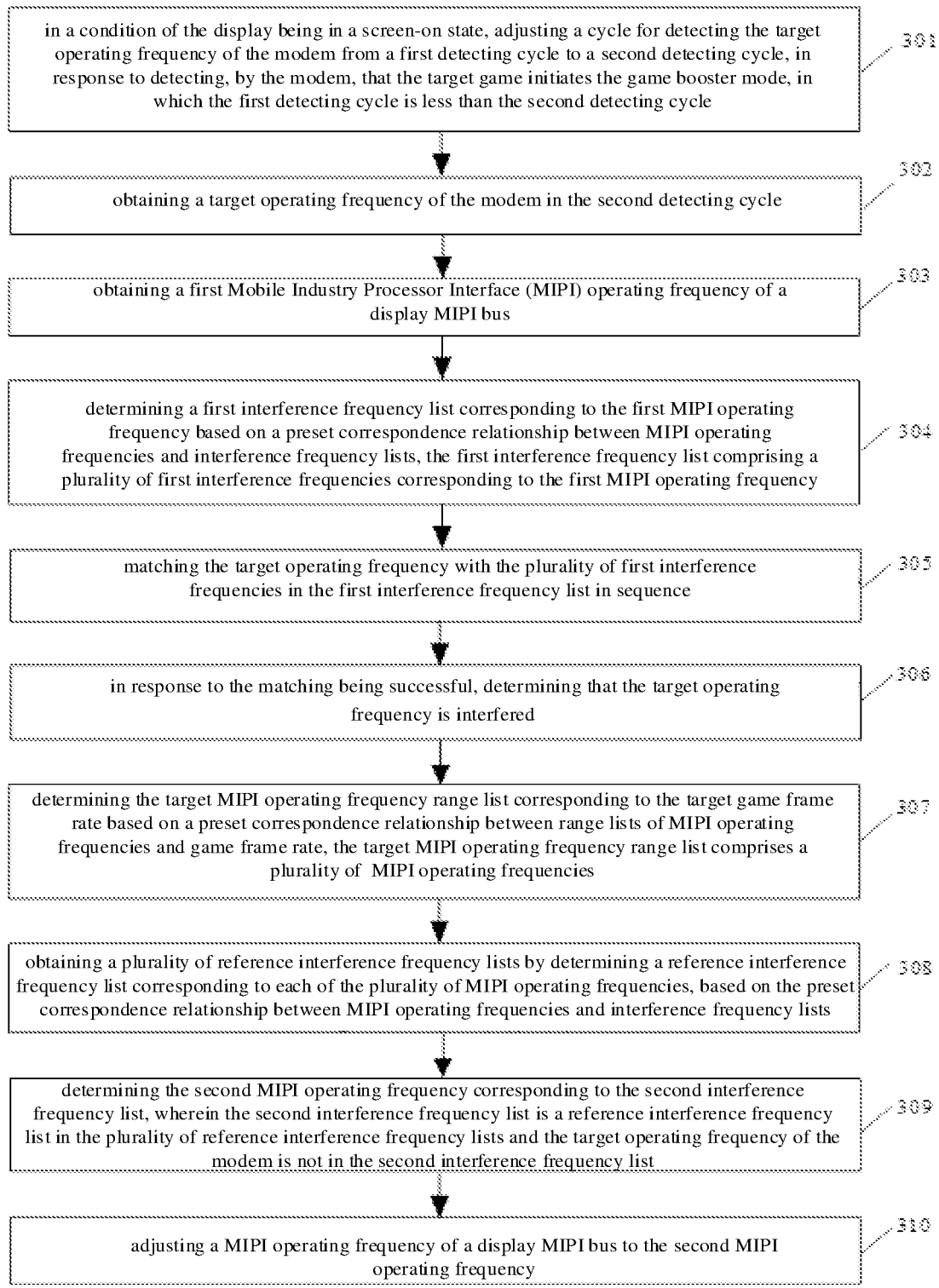
FIG. 5 is a flowchart of another display control method according to an embodiment of the present disclosure.

Consistent with the foregoing, FIG. 5 is a flowchart of another display control method according to an embodiment of the present disclosure. The method is applied to the electronic device illustrated in FIG. 1, the electronic device includes a display and a modem, and the display control method includes the following blocks.

At block 301, during the electronic device is running a target game, in a condition of the display being in a screen-on state, a cycle for detecting a target operating frequency of the modem is adjusted from a first detecting cycle to a second detecting cycle in response to detecting, by the modem, that the target game initiates a game booster mode. The first detecting cycle is less than the second detecting cycle.

At block 302, a target operating frequency of the modem is obtained with the second detecting cycle.

At block 303, a first MIPI operating frequency of a display MIPI bus is obtained.

At block 304, a first interference frequency list corresponding to the first MIPI operating frequency is determined based on a preset correspondence relationship between MIPI operating frequencies and interference frequency lists, the first interference frequency list includes a plurality of first interference frequencies corresponding to the first MIPI operating frequency.

At block 305, the target operating frequency is matched with the plurality of first interference frequencies in the first interference frequency list in sequence.

At block 306, in response to the matching being successful, it is determined that the target operating frequency is interfered, and a target game frame rate of the target game is obtained.

At block 307, the target MIPI operating frequency range list corresponding to the target game frame rate is determined based on a preset correspondence relationship between MIPI operating frequency range lists and game frame rates, the target MIPI operating frequency range list includes a plurality of MIPI operating frequencies.

At block 308, a reference interference frequency list corresponding to each of the plurality of MIPI operating frequencies is determined, based on the preset correspondence relationship between MIPI operating frequencies and interference frequency lists, to obtain a plurality of reference interference frequency lists.

At block 309, the second MIPI operating frequency corresponding to the second interference frequency list is determined. The second interference frequency list is a reference interference frequency list in the plurality of reference interference frequency lists and without the target operating frequency of the modem falling into At block 310, a MIPI operating frequency of the display MIPI bus is adjusted to the second MIPI operating frequency.

For the detailed description of blocks 301 to 310, reference may be made to the corresponding description of the display control method described in FIG. 3, which is not repeated here.

According to the display control method, during the electronic device is running the target game and the display is in the screen-on state, the cycle for detecting the target operating frequency of the modem is adjusted from the first detecting cycle to the second detecting cycle in response to detecting, by the modem, that the target game initiates the game booster mode. The target operating frequency of the modem is obtained with the second detecting cycle. The first MIPI operating frequency of the display MIPI bus is obtained. The first interference frequency list corresponding to the first MIPI operating frequency is determined based on the preset correspondence relationship between the MIPI operating frequencies and the interference frequency lists. Whether the target operating frequency is interfered is determined based on the first MIPI operating frequency and the first interference frequency list. The target game frame rate of the target game is obtained in response to the matching being successful. The target MIPI operating frequency range list corresponding to the target game frame rate is determined based on the preset correspondence relationship between the MIPI operating frequency range lists and the game frame rates, the target MIPI operating frequency range list includes the plurality of MIPI operating frequencies. The second MIPI operating frequency having the least interference on the target operating frequency of the modem is determined from the plurality of MIPI operating frequencies. The MIPI operating frequency of the display MIPI bus is adjusted to the second MIPI operating frequency. In this way, in the scenario where the electronic device is running the target game application, when it is detected that the target game has initiated the game booster mode, the frequency for detecting the target operating frequency of the modem is reduced, thereby reducing power consumption and dynamically adjusting the MIPI operating frequency of the display without changing the hardware design of the electronic device, so as to eliminate or reduce electromagnetic interference on modem communication and achieve good communication performance.

Figure 6:
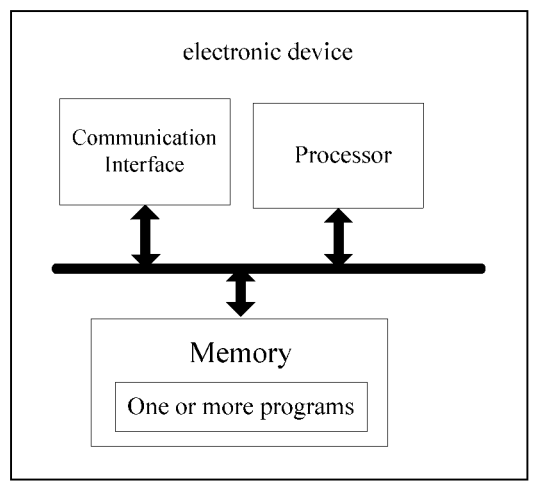
FIG. 6 is a schematic diagram of another electronic device according to an embodiment of the present disclosure.

FIG. 6 is a schematic diagram of another electronic device according to an embodiment of the present disclosure. As illustrated in FIG. 6, the electronic device includes a processor, a memory, a communication interface, and one or more programs. The one or more programs are stored in the memory and are configured to be executed by the processor. The above program includes instructions for performing the following blocks.

During the electronic device is running a target game, a target operating frequency of the modem is obtained in response to detecting that the target game initiates a game booster mode. A first MIPI operating frequency of a display MIPI bus is obtained. It is determined whether the target operating frequency is interfered based on the first MIPI operating frequency, and a target game frame rate of the target game is obtained in response to the target operating frequency being interfered. A target MIPI operating frequency range list corresponding to the target game frame rate is determined, the target MIPI operating frequency range list includes a plurality of MIPI operating frequencies. A second MIPI operating frequency having least interference on the target operating frequency of the modem is determined from the plurality of MIPI operating frequencies. A MIPI operating frequency of the display MIPI bus is adjusted to the second MIPI operating frequency.

In an embodiment, prior to obtaining the target operating frequency of the modem, the above program also includes instructions for performing the following blocks.

In a condition of the display being in a screen-on state, adjusting a cycle for detecting the target operating frequency of the modem from a first detecting cycle to a second detecting cycle in response to detecting, by the modem, that the target game initiates the game booster mode. The first detecting cycle is less than the second detecting cycle.

In an embodiment, determining whether the target operating frequency is interfered based on the first MIPI operating frequency includes: determining a first interference frequency list corresponding to the first MIPI operating frequency based on a preset correspondence relationship between MIPI operating frequencies and interference frequency lists, the first interference frequency list comprising a plurality of first interference frequencies corresponding to the first MIPI operating frequency; and matching the target operating frequency with the plurality of first interference frequencies in the first interference frequency list in sequence, and determining that the target operating frequency is interfered in response to the matching being successful.

In an embodiment, determining the target MIPI operating frequency range list corresponding to the target game frame rate includes: determining the target MIPI operating frequency range list corresponding to the target game frame rate based on a preset correspondence relationship between MIPI operating frequency range lists and game frame rates.

In an embodiment, determining the second MIPI operating frequency having least interference on the target operating frequency of the modem from the plurality of MIPI operating frequencies includes: obtaining a plurality of reference interference frequency lists by determining a reference interference frequency list corresponding to each of the plurality of MIPI operating frequencies, based on the preset correspondence relationship between MIPI operating frequencies and interference frequency lists; and determining the second MIPI operating frequency corresponding to the second interference frequency list. The second interference frequency list is a reference interference frequency list in the plurality of reference interference frequency lists and the target operating frequency of the modem is not in the second interference frequency list.

The embodiments mainly introduce the solution of the embodiments of the present disclosure from the perspective of the execution process on the method side. It is understood that, in order to implement the above functions, an electronic device includes hardware structures and/or software modules corresponding to each function. Those skilled in the art should easily realize that in combination with the units and algorithm steps of the examples described in the embodiments, the present disclosure is implemented in the form of hardware or a combination of hardware and computer software. Whether a certain function is executed by hardware or computer software-driven hardware depends on the specific application and design constraint conditions of the technical solution. Those skilled in the art adopt different methods for each specific application to implement the described functions, but such implementation should not be considered beyond the scope of the present disclosure.

The embodiments of the present disclosure may divide the electronic device into functional units according to the method examples. For example, each functional unit may be divided corresponding to each function, or two or more functions may be integrated into one processing unit. The above integrated unit is implemented in the form of hardware or software functional unit. It should be noted that the division of units in the embodiments of the present disclosure is illustrative, and is only divided based on logical functions, and there may be other division methods in actual implementation.

Figure 7:
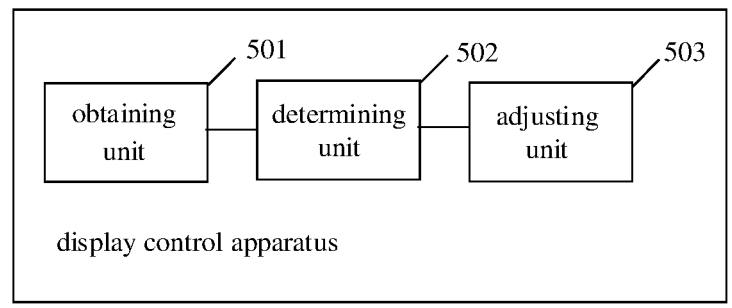
FIG. 7 is a schematic diagram of a display control apparatus according to an embodiment of the present disclosure.

FIG. 7 is a schematic diagram of a display control apparatus according to an embodiment of the present disclosure. An electronic device is shown in FIG. 1, the electronic device includes a display and a modem. The display control apparatus includes: an obtaining unit 501, a determining unit 502 and an adjusting unit 503.

The obtaining unit 501 is configured to, during the electronic device is running a target game, obtain a target operating frequency of the modem in response to detecting that the target game initiates a game booster mode, and obtain a first MIPI operating frequency of a display MIPI bus.

The determining unit 502 is configured to determine whether the target operating frequency is interfered based on the first MIPI operating frequency.

The obtaining unit 501 is further configured to obtain a target game frame rate of the target game in response to the target operating frequency being interfered.

The determining unit 502 is further configured to determine a target MIPI operating frequency range list corresponding to the target game frame rate, the target MIPI operating frequency range list comprising a plurality of MIPI operating frequencies, and determine a second MIPI operating frequency having least interference on the target operating frequency of the modem from the plurality of MIPI operating frequencies in the target MIPI operating frequency range list.

The adjusting unit 503 is configured to adjust a MIPI operating frequency of the display MIPI bus to the second MIPI operating frequency.

Optionally, prior to obtaining the target operating frequency of the modem, the adjusting unit 503 is further configured to: in a condition of the display being in a screen-on state, adjust a cycle for detecting the target operating frequency of the modem from a first detecting cycle to a second detecting cycle in response to detecting, by the modem, that the target game initiates the game booster mode. The first detecting cycle is less than the second detecting cycle.

Optionally, in determining whether the target operating frequency is interfered based on the first MIPI operating frequency, the determining unit 502 is configured to: determine a first interference frequency list corresponding to the first MIPI operating frequency based on a preset correspondence relationship between MIPI operating frequencies and interference frequency lists, the first interference frequency list comprising a plurality of first interference frequencies corresponding to the first MIPI operating frequency; and match the target operating frequency with the plurality of first interference frequencies in the first interference frequency list in sequence, and determine that the target operating frequency is interfered in response to the matching being successful.

Optionally, in determining the target MIPI operating frequency range list corresponding to the target game frame rate, the determining unit 502 is configured to: determine the target MIPI operating frequency range list corresponding to the target game frame rate based on a preset correspondence relationship between MIPI operating frequency range lists and game frame rates.

Optionally, in determining the second MIPI operating frequency having least interference on the target operating frequency of the modem from the plurality of MIPI operating frequencies, the determining unit 502 is configured to: obtain a plurality of reference interference frequency lists by determining a reference interference frequency list corresponding to each of the plurality of MIPI operating frequencies, based on the preset correspondence relationship between MIPI operating frequencies and interference frequency lists; and determine the second MIPI operating frequency corresponding to the second interference frequency list. The second interference frequency list is a reference interference frequency list in the plurality of reference interference frequency lists and the target operating frequency of the modem is not in the second interference frequency list.

With the display control apparatus according to the embodiments of the present disclosure, during the electronic device is running a target game, in response to detecting that the target game initiates a game booster mode, a target operating frequency of the modem is obtained. A first MIPI operating frequency of a display MIPI bus is obtained. It is determined whether the target operating frequency is interfered based on the first MIPI operating frequency, and a target game frame rate of the target game is obtained in response to the target operating frequency being interfered. A target MIPI operating frequency range list corresponding to the target game frame rate is determined, the target MIPI operating frequency range list includes a plurality of MIPI operating frequencies. A second MIPI operating frequency having least interference on the target operating frequency of the modem is determined from the plurality of MIPI operating frequencies. A MIPI operating frequency of the display MIPI bus is adjusted to the second MIPI operating frequency.

During the electronic device is running a target game, in response to detecting that the target game initiates a game booster mode, a target operating frequency of the modem is obtained. A first MIPI operating frequency of a display MIPI bus is obtained. It is determined whether the target operating frequency is interfered based on the first MIPI operating frequency, and a target game frame rate of the target game is obtained in response to the target operating frequency being interfered. A target MIPI operating frequency range list corresponding to the target game frame rate is determined, the target MIPI operating frequency range list includes a plurality of MIPI operating frequencies. A second MIPI operating frequency having least interference on the target operating frequency of the modem is determined from the plurality of MIPI operating frequencies. A MIPI operating frequency of the display MIPI bus is adjusted to the second MIPI operating frequency. In this way, without changing hardware design of the electronic device, the MIPI operating frequency of the display is dynamically adjusted in the scenario where the electronic device is running a game application, thereby eliminating or reducing electromagnetic interference on modem communication and achieve good communication performance.

It should be noted that the electronic device described in the embodiments of the present disclosure are presented in the form of functional units. The term "unit" should be understood as the broadest possible meaning. The objects used to implement the functions described by each "unit" may be an integrated circuit ASIC, a single circuit, a processor (shared, dedicated or chipset) used to execute one or more software or firmware and a memory, a combinational logic circuit, and/or other suitable components that implement the above functions The obtaining unit 501, the determining unit 502, and the adjusting unit 503 may be control circuits or processors.

Embodiments of the present disclosure provide a computer-readable storage medium storing a computer program for electronic data exchange, and the computer program is configured to cause a computer to execute part or all of the method according to the embodiments of the first aspect.

Embodiments of the present disclosure provide a computer program product. The computer program product includes a non-transitory computer-readable storage medium storing a computer program, and the above computer program is operable to cause a computer to execute part or all of the steps described in the first aspect of the embodiments of the present disclosure.

It should be noted that to simply describe the above method embodiments, the embodiments are all expressed as a series of action combinations, but those skilled in the art should know that the present disclosure is not limited by the described sequence of actions. In the present disclosure, some steps can be performed in other order or at the same time. Secondly, those skilled in the art should also know that the embodiments are all preferred embodiments, and the actions and modules involved are not necessarily required by the present disclosure.

In the above embodiments, the description of each embodiment has its own emphasis. For parts that are not described in detail in an embodiment, reference may be made to related descriptions of other embodiments.

In the embodiments, it should be understood that the disclosed device may be implemented in other ways. For example, the device embodiments described above are merely illustrative. For example, the division of the units is based on logical functions and there may be other division methods in actual implementation, for example, a plurality of units or components may be combined or integrated into another system, or some features are ignored or not implemented. In addition, the displayed or discussed mutual coupling, direct coupling or communication connection may be indirect coupling or communication connection through some interfaces, devices or units, or may be connected electrically or in other forms.

The units described as separate components may or may not be physically separated, and the components displayed as units may or may not be physical units, that is, the units may be located in one place, or distributed on a plurality of network units. Some or all of the units may be selected according to actual needs to achieve the objectives of the solution of the embodiments.

In addition, the functional units in each embodiment of the present disclosure may be integrated into one processing unit, or each unit may exist alone physically, or two or more units may be integrated into one unit. The above-mentioned integrated unit may be implemented in the form of hardware or software program module.

If the integrated unit is implemented in the form of a software program module and sold or used as an independent product, the integrated unit may be stored in a computer readable memory. On the basis, the technical solution of the present disclosure essentially or all or part of the technical solution that contributes to the existing technology may be embodied in the form of software products, and the computer software product is stored in a memory, which includes several instructions to make a computer device (which may be a personal computer, a server, or a network device) to execute all or part of the steps of the methods described in the embodiments of the present disclosure. The memory includes: U-Drives, read-only memory (ROM), random access memory (RAM), mobile hard disk, magnetic disk or optical disk and other media that could store program codes.

Those of ordinary skill in the art could understand that all or part of the steps in the method of the above embodiments is completed by relevant hardware instructed by programs. The programs are stored in a computer-readable memory, and the memory includes: a flash disk, a ROM, a RAM, a magnetic disk or a CD-ROM.

The embodiments of the disclosure are described in detail above, and specific examples are to illustrate the principles and implementation of the present disclosure. The descriptions of the above examples are only used to help understand the methods and core ideas of the present disclosure. Meanwhile, for those skilled in the art, based on the ideas of the present disclosure, there may be changes in the specific implementation and the scope of the present disclosure. In conclusion, the content of the present disclosure should not be construed as a limitation to the present disclosure.

What is claimed is:

1. A display control method for an electronic device comprising a display and a modem, and the method comprising:
    obtaining a target operating frequency of the modem in response to detecting that a target game initiates a game booster mode;
    obtaining a first MIPI operating frequency of a display MIPI bus;
    obtaining a target game frame rate of the target game in response to detecting the target operating frequency is interfered based on the first MIPI operating frequency;
    determining a target MIPI operating frequency range list corresponding to the target game frame rate, the target MIPI operating frequency range list comprising a plurality of MIPI operating frequencies;
    determining a second MIPI operating frequency having least interference on the target operating frequency of the modem from the plurality of MIPI operating frequencies in the target MIPI operating frequency range list; and
    adjusting a MIPI operating frequency of the display MIPI bus to the second MIPI operating frequency.

2. The method according to claim 1, prior to obtaining the target operating frequency of the modem, the method further comprising:
    in a condition of the display being in a screen-on state, adjusting a cycle for detecting the target operating frequency of the modem from a first detecting cycle to a second detecting cycle, in response to detecting, by the modem, that the target game initiates the game booster mode, in which the first detecting cycle is less than the second detecting cycle.

3. The method according to claim 1, wherein, detecting the target operating frequency is interfered based on the first MIPI operating frequency comprises:
    determining a first interference frequency list corresponding to the first MIPI operating frequency based on a preset correspondence relationship between MIPI operating frequencies and interference frequency lists, the first interference frequency list comprising a plurality of first interference frequencies corresponding to the first MIPI operating frequency; and
    determining that the target operating frequency is interfered in response to the target operating frequency matching with one of the plurality of first interference frequencies in the first interference frequency list.

4. The method according to claim 1, wherein, determining the target MIPI operating frequency range list corresponding to the target game frame rate comprises:
    determining the target MIPI operating frequency range list corresponding to the target game frame rate based on a preset correspondence relationship between MIPI operating frequency range lists and game frame rates.

5. The method according to claim 3, wherein determining the second MIPI operating frequency having the least interference on the target operating frequency of the modem from the plurality of MIPI operating frequencies comprises:
    obtaining a plurality of reference interference frequency lists by determining a reference interference frequency list corresponding to each of the plurality of MIPI operating frequencies, based on the preset correspondence relationship between MIPI operating frequencies and interference frequency lists; and
    determining the second MIPI operating frequency corresponding to a second interference frequency list, wherein the second interference frequency list is a reference interference frequency list in the plurality of reference interference frequency lists and the target operating frequency of the modem is not in the second interference frequency list.

6. The method according to claim 1, wherein, the game booster mode is a mode for boosting the target game through a dedicated channel which is fixed;
    wherein the modem transmits data on the dedicated channel.

7. An electronic device, comprising a storage and processing circuit, a display and a modem connected to the storage and processing circuit, wherein,
    the modem is configured to, obtain a target operating frequency of the modem in response to detecting that a target game initiates a game booster mode;
    the display is configured to obtain a first MIPI operating frequency of a display MIPI bus;
    the storage and processing circuit is configured to obtain a target game frame rate of the target game in response to detecting the target operating frequency is interfered based on the first MIPI operating frequency;
    the storage and processing circuit is further configured to determine a target MIPI operating frequency range list corresponding to the target game frame rate, the target MIPI operating frequency range list comprising a plurality of MIPI operating frequencies, and determine a second MIPI operating frequency having least interference on the target operating frequency of the modem from the plurality of MIPI operating frequencies in the target MIPI operating frequency range list; and
    the display is configured to adjust a MIPI operating frequency of a display MIPI bus to the second MIPI operating frequency.

8. The electronic device according to claim 7, wherein prior to obtaining the target operating frequency of the modem, the modem is further configured to:
    in a condition of the display being in a screen-on state, adjust a cycle for detecting the target operating frequency of the modem from a first detecting cycle to a second detecting cycle, in response to detecting, by the modem, that the target game initiates the game booster mode, in which the first detecting cycle is less than the second detecting cycle.

9. The electronic device according to claim 7, wherein in the storage and processing circuit is configured to:
    determine a first interference frequency list corresponding to the first MIPI operating frequency based on a preset correspondence relationship between MIPI operating frequencies and interference frequency lists, the first interference frequency list comprising a plurality of first interference frequencies corresponding to the first MIPI operating frequency; and
    determine that the target operating frequency is interfered in response to the target operating frequency matching with one of the plurality of first interference frequencies in the first interference frequency list.

10. The electronic device according to claim 7, wherein in determining the target MIPI operating frequency range list corresponding to the target game frame rate, the storage and processing circuit is configured to:
    determine the target MIPI operating frequency range list corresponding to the target game frame rate based on a preset correspondence relationship between MIPI operating frequency range lists and game frame rates.

11. The electronic device according to claim 9, wherein in determining the second MIPI operating frequency having least interference on the target operating frequency of the modem from the plurality of MIPI operating frequencies, the storage and processing circuit is configured to:
obtain a plurality of reference interference frequency lists by determining a reference interference frequency list corresponding to each of the plurality of MIPI operating frequencies, based on the preset correspondence relationship between MIPI operating frequencies and interference frequency lists; and
determine the second MIPI operating frequency corresponding to a second interference frequency list, wherein the second interference frequency list is a reference interference frequency list in the plurality of reference interference frequency lists and the target operating frequency of the modem is not in the second interference frequency list.

12. The electronic device according to claim 7, wherein, the game booster mode is a mode for boosting the target game through a dedicated channel which is fixed;
wherein the modem transmits data on the dedicated channel.

13. A non-transitory computer-readable storage medium storing a computer program for electronic data exchange, wherein the computer program is configured to cause a computer to execute a display control method, for an electronic device comprising a display and a modem, and the method comprising:
obtaining a target operating frequency of the modem in response to detecting that a target game initiates a game booster mode;
obtaining a first MIPI operating frequency of a display MIPI bus;
obtaining a target game frame rate of the target game in response to detecting the target operating frequency is interfered based on the first MIPI operating frequency;
determining a target MIPI operating frequency range list corresponding to the target game frame rate, the target MIPI operating frequency range list comprising a plurality of MIPI operating frequencies;
determining a second MIPI operating frequency having least interference on the target operating frequency of the modem from the plurality of MIPI operating frequencies in the target MIPI operating frequency range list; and
adjusting a MIPI operating frequency of the display MIPI bus to the second MIPI operating frequency.

14. The non-transitory computer-readable storage medium according to claim 13, prior to obtaining the target operating frequency of the modem, the method further comprising:
in a condition of the display being in a screen-on state, adjusting a cycle for detecting the target operating frequency of the modem from a first detecting cycle to a second detecting cycle, in response to detecting, by the modem, that the target game initiates the game booster mode, in which the first detecting cycle is less than the second detecting cycle.

15. The non-transitory computer-readable storage medium according to claim 13, wherein, detecting the target operating frequency is interfered based on the first MIPI operating frequency comprises:
determining a first interference frequency list corresponding to the first MIPI operating frequency based on a preset correspondence relationship between MIPI operating frequencies and interference frequency lists, the first interference frequency list comprising a plurality of first interference frequencies corresponding to the first MIPI operating frequency; and
determining that the target operating frequency is interfered in response to the target operating frequency matching with one of the plurality of first interference frequencies in the first interference frequency list.

16. The non-transitory computer-readable storage medium according to claim 13, wherein, determining the target MIPI operating frequency range list corresponding to the target game frame rate comprises:
determining the target MIPI operating frequency range list corresponding to the target game frame rate based on a preset correspondence relationship between MIPI operating frequency range lists and game frame rates.

17. The non-transitory computer-readable storage medium according to claim 15, wherein determining the second MIPI operating frequency having the least interference on the target operating frequency of the modem from the plurality of MIPI operating frequencies comprises:
obtaining a plurality of reference interference frequency lists by determining a reference interference frequency list corresponding to each of the plurality of MIPI operating frequencies, based on the preset correspondence relationship between MIPI operating frequencies and interference frequency lists; and
determining the second MIPI operating frequency corresponding to a second interference frequency list, wherein the second interference frequency list is a reference interference frequency list in the plurality of reference interference frequency lists and the target operating frequency of the modem is not in the second interference frequency list.

18. The non-transitory computer-readable storage medium according to claim 13, wherein, the game booster mode is a mode for boosting the target game through a dedicated channel which is fixed;
wherein the modem transmits data on the dedicated channel.

* * * * *